United States Patent Office 3,563,776
Patented Feb. 16, 1971

3,563,776
REFRACTORY BARIUM-AND-CALCIUM ALUMINOUS CEMENTS
Alexandru I. Braniski, Teodor D. Ionescu, and Neculaie Deica, Bucharest, Rumania, assignors to Institutul de Cercetari Metalurgice, Bucharest, Rumania, a corporation
No Drawing. Filed Feb. 20, 1968, Ser. No. 706,788
Claims priority, application Rumania, July 3, 1967, 54,196
Int. Cl. C04b 7/32, 35/10
U.S. Cl. 106—104     3 Claims

ABSTRACT OF THE DISCLOSURE

A barium-and-calcium alumina cement consisting essentially of 22 to 37% barium oxide, 9 to 15% calcium oxide, 50 to 65% alumina, up to 1.5% silica, up to 1% $Fe_2O_3$, up to 1.5% magnesia and sodium oxide and potassium oxide to a maximum of 0.5%.

---

Refractory calcium aluminous cements, almost free of fluxing agents ($Fe_2O_3$, $SiO_2$, $MgO$, $Na_2O+K_2O$, etc. their total not exceeding 2%), their basic constituents being calcium aluminate, $CaO \cdot Al_2O_3$ and calcium dialuminate, $CaO \cdot 2Al_2O_3$, are used at present as hydraulic bonding agents in the preparation of refractory concretes (to be utilized above 1580° C.).

These aluminous cements can be used effectively at temperatures between 1500 and 1690° C. They are manufactured from limestone and calcined alumina, and increasingly refractory with an increase in $Al_2O_3$, the maximum being about 80%. Concrete of more highly refractory character could of course be prepared from aluminous cements alone, so as to have operating temperatures above 1690° C. To this end, there have been prepared, but are not yet manufactured, refractory barium aluminous cements (their basic constituent being barium aluminate, $BaO \cdot Al_2O_3$) with refractory capability to 1800° C. Refractory calcium aluminous cements with up to 6% BaO as fluxing agent have been prepared too.

The refractory barium aluminous cements have the highest refractoriness, but they also have disadvantages, i.e. anomalies of hydration and hardening. These anomalies have been completely eliminated by creating refractory barium-and-calcium cements, in accordance with the present invention.

These refractory aluminous cements have as basic constituents calcium dialuminate and the barium aluminate, and are obtained from a homogeneous mixture of very fine powders of calcined alumina and limestone plus witherite ($BaCO_3$) or barytes ($BaSO_4$), or from other similar raw materials, by firing until sintering or fusion.

These new refractory aluminous cements have the following chemical composition limits:

| | Percent |
|---|---|
| $SiO_2$ | 0–1.5 |
| $Al_2O_3$ | 50–65 |
| $Fe_2O_3$ | 0–1 |
| CaO | 9–15 |
| BaO | 22–37 |
| MgO | 0–1.5 |
| $Na_2O+K_2O$ | 0–0.5 |
| Total | 100 |

They are more refractory than the corresponding refractory calcium amuminous cements, but less refractory than the known refractory barium aluminous cements.

The method of manufacturing the refractory barium-and-calcium aluminous cements is similar to the process for the manufacture of the known refractory calcium aluminous cements, the equipment, used, including the furnaces, remaining the same.

By manufacturing these new refractory cements from barytes, a reducing firing of the clinker in the presence of carbon, as reducing agent, need not to be employed because with an oxidizing firing above 1550° C., the barytes of the mixture are desulphated spontaneously. Possible insignificant residues of nondesulphated barytes are not at all harmful, and do not degrade the quality of the resulting cement because they allow an increase of the alumina content in the reacting mass and improve the refractoriness of the cement clinker. Barium oxide itself, resulting from a subsequent desulphating of barytes, has a very high melting point (1923° C.), and reacts stepwise at high temperatures until its complete disappearance.

Refractory concretes made from proper refractory aggregates and refractory barium-and-calcium aluminous cements have higher utilization temperatures than the corresponding concretes made with the known refractory calcium aluminous cements.

The application of this invention is illustrated in the following two examples.

EXAMPLE 1

18.9% of limestone, 30.3% of barytes and 50.8% of calcined alumina are very finely ground, then admixed and homogenized. The raw materials used have the following chemical composition:

Limestone: $SiO_2$ 1.78%; $Al_2O_3$ 0.95%; $Fe_2O_3$ 0.43%; CaO 52.50; MgO 1.27%; $CO_2$ 42.81%; $H_2O$ 0.25%.

Barytes: $SiO_2$ 1.86%; $Al_2O_3$ 0.12%; $Fe_2O_3$ 0.45%; CaO 0.27%; BaO 62.32%; MgO 0.98%; $Na_2O+K_2O$ 0.26%; $SO_3$ 32.75%; $CO_2$ 0.82%; $H_2O$ 0.31%.

Calcined alumina: $SiO_2$ 0.04%; $Al_2O_3$ 98.23%; $Fe_2O_3$ 0.21%; CaO 0.28%; MgO 0.67%; $Na_2O+K_2O$ 0.62%.

The above mixture is burned to sintering at 1600° to 1650° C. in the usual cement furnace. After slowly cooling, the resulting clinker is as finely ground as portland cement.

The resulting refractory barium-and-calcium aluminous cement is not a hydraulic bonding agent, because it is disaggregated under water, but an air bonding agent with normal setting and rapid hardening (very high mechanical strength after 24 hours). The fact that it is not a hydraulic but an air bonding agent is not disadvantageous for a refractory cement, since it will not be used under water or in a humid atmosphere. In use, when it is first heated to temperatures above 1100°, it is dehydrated and transformed into a ceramic bonding agent, which will thereafter resist humidity perfectly and may be maintained indefinitely under water.

This new refractory aluminous cement is constituted of approximately 2 moles of calcium dialuminate and 1 mole of barium monoaluminate, plus impurities in form of tetrabarium aluminoferrite, dibarium silicate and spinel. It has a refractoriness of 1730° C., and its compressive strengths are the following: 380 kgf./cm.$^2$ after 24 hours, 472 kgf./cm.$^2$ after 3 days, and 524 kgf./cm.$^2$ after 7 days.

The refractory concrete prepared from 20% of cement and 80% of white corundum as refractory aggregates, having 16% of the granules of $\phi<0.2$ mm., 32% between 0.5 and 2 mm., and 32% between 2 and 5 mm., has a refractoriness of 1880° C.

EXAMPLE 2

Proceeding as in Example 1, but starting with 13.8% of limestone, 42.6% of barytes, and 43.6% of calcined alumina, a refractory cement is obtained that is constituted by approximately 1 mole of calcium dialuminate and 1 mole of barium monoaluminate, plus the impurities mentioned in Example 1, but in another ratio. It has a refractoriness of 1770° C., and compressive strengths of: 453 kgf./cm.$^2$ after 24 hours, 531 kgf./cm.$^2$ after 3 days, and 569 kgf./cm.$^2$ after 7 days.

The refractory concrete prepared from 20% of cement and 80% of magnesite as refractory aggregates, having the same granulation as in Example 1, has a refractoriness of 1960° C.

As compared with the refractory barium aluminous cements, the refractory barium-and-calcium aluminous cements, that form the subject of the present invention, offer the following advantages (qualitative ameliorations):

(1) They show no hydraulic anomalies that are not yet completely eliminated from the refractory barium aluminous cements, and may be thus more easily worked in the form of mortars and concretes.

(2) They develop less heat during setting and hardening and may thus be used with less difficulty when making massive refractory concrete blocks of large sizes.

(3) They do not expand (dilate) during setting, and may be therefore more easily struck (from shuttering) or withdrawn (from mold).

(4) They have a normal and not a rapid set. Hence, they may be worked and used as mortars or concrete without haste or risks of too early setting.

(5) When worked with aluminous aggregates (corundum, spinel, bauxite, etc.), they manifest to a minor extent expanding phenomena at high temperatures (before sintering), this reducing some of the disadvantages in certain cases.

(6) They are less soluble in water and therefore less exposed to the action of air moisture before being subjected for the first time after hardening to high temperatures, that is before their transition from a ceramic bonding agent.

As compared with the refractory calcium aluminous cements on calcium dialuminate basis, that are manufactured at present, the refractory barium-and-calcium aluminous cements are more profitable (lower cost price), because they have a lower alumina content (50 to 65% $Al_2O_3$ against 70 to 80%), alumina being the raw material for refractory aluminous cements that has the highest cost price.

Hence the refractory barium-and-calcium aluminous cements are more advantageous for the preparation of refractory concretes and mortars of higher quality (with very high melting point and refractoriness-under-load), and for the manufacturing of chemically bonded (unburned) refractories, by means of various refractory aggregates, of refractory crucibles, of refractory supports for tunnel kiln cars, of doors for coke ovens and similar products, as well as for refractory linings and rapid repairing of all sorts of industrial and laboratory furnaces.

We claim:

1. A refractory cement consisting essentially of 22 to 37% barium oxide, 9 to 15% calcium oxide, 50 to 65% alumina, up to 1.5% silica, up to 1% $Fe_2O_3$, up to 1.5% magnesia and sodium oxide and potassium oxide to a maximum of 0.5%.

2. The refractory cement defined in claim 1 and consisting of a mixture of finely divided alumina, limestone and barytes or witherite fired at a temperature of 1450 to 1650° C. to produce a clinker.

3. The refractory cement defined in claim 2 wherein firing is carried out at a temperature of 1550 to 1650° C.

References Cited

UNITED STATES PATENTS

| | | | |
|---|---|---|---|
| 3,257,219 | 6/1966 | Klein | 106—104 |
| 1,643,136 | 9/1927 | Spackman | 106—104 |
| 1,507,379 | 9/1924 | Hoskins | 106—104 |

OTHER REFERENCES

Braniski, A., "Chemistry of Cement, Proceedings of the Fourth International Symposium" pp. 1083–1091 (1960).

Tea and Desch, "The Chemistry of Cement and Concrete," Edw. Arnold & Sons, pp. 471–472 (1956).

TOBIAS E. LEVOW, Primary Examiner

W. T. SCOTT, Assistant Examiner

U.S. Cl. X.R.

106—64, 65